United States Patent
Gabriel et al.

(10) Patent No.: US 6,450,275 B1
(45) Date of Patent: Sep. 17, 2002

(54) POWER ELECTRONICS COOLING FOR A HYBRID ELECTRIC VEHICLE

(75) Inventors: David Gabriel, Royal Oak; Stephen John Kotre, Ann Arbor, both of MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/705,024

(22) Filed: Nov. 2, 2000

(51) Int. Cl.[7] .................................................. B60K 1/00
(52) U.S. Cl. ........................ 180/65.4; 180/68.4; 165/41; 165/51
(58) Field of Search ........................ 702/99, 130; 236/3, 236/35; 417/243; 180/65.1, 65.2, 68.1, 68.4, 68.2, 65.6, 65.3, 65.4; 165/42, 43, 41, 51; 123/41.31, 41.29, 41.49

(56) References Cited

U.S. PATENT DOCUMENTS

| | | | |
|---|---|---|---|
| 4,955,431 A | * 9/1990 | Sauer et al. | 165/1 |
| 5,255,733 A | * 10/1993 | King | 165/299 |
| 5,291,960 A | * 3/1994 | Brandenburg et al. | 180/65.2 |
| 5,343,970 A | * 9/1994 | Severinsky | 180/65.2 |
| 5,531,285 A | * 7/1996 | Green | 280/65.2 |
| 5,537,956 A | * 7/1996 | Rennfeld et al. | 123/41.29 |
| 5,647,668 A | * 7/1997 | Schnaibel et al. | 374/144 |
| 5,678,760 A | * 10/1997 | Muso et al. | 237/2 A |
| 5,690,186 A | * 11/1997 | Sugioka et al. | 180/273 |
| 5,718,373 A | * 2/1998 | Kim et al. | 236/35 |
| 5,898,282 A | * 4/1999 | Drozdz et al. | 318/139 |
| 5,947,189 A | * 9/1999 | Takeuchi et al. | 165/51 |
| 6,048,289 A | * 4/2000 | Hattori et al. | 477/15 |
| 6,053,842 A | * 4/2000 | Kitada et al. | 477/5 |
| 6,118,237 A | * 9/2000 | Kikuchi et al. | 318/139 |
| 6,126,079 A | * 10/2000 | Shoemaker | 236/35 |
| 6,166,934 A | * 12/2000 | Kajouke et al. | 363/65 |
| 6,123,233 A1 | * 4/2001 | Sonntag et al. | 180/65.2 |
| 6,215,198 B1 | * 4/2001 | Inada et al. | 290/40 |
| 6,242,873 B1 | * 6/2001 | Drozdz et al. | 318/139 |
| 6,321,697 B1 | * 11/2001 | Matsuda et al. | 123/41.29 |
| 6,340,006 B1 | * 1/2002 | Malatto et al. | 123/41.29 |
| 6,343,572 B1 | * 2/2002 | Pfaff et al. | 123/41.01 |
| 6,357,541 B1 | * 3/2002 | Matsuda et al. | 180/68.2 |
| 6,374,780 B1 | * 4/2002 | Rutyna et al. | 123/41.12 |

FOREIGN PATENT DOCUMENTS

| | | |
|---|---|---|
| EP | 1122104 A2 | 8/2001 |
| JP | 110278065 A | 10/1999 |
| JP | 110285106 A | 10/1999 |
| JP | 110022460 A | 1/2000 |
| JP | 2000073763 A | 7/2000 |

* cited by examiner

*Primary Examiner*—Paul N. Dickson
*Assistant Examiner*—Laura B. Rosenberg
(74) *Attorney, Agent, or Firm*—Carlos L. Hanze

(57) ABSTRACT

This invention is a method and system for cooling Hybrid Electric Vehicle ("HEV") components. The present invention cools HEV components, including an A/C system, an Internal Combustion Engine and its associated parts, an electric drive system and its associated parts, including an inverter, a DC/DC Converter, a generator motor, and a traction motor. Cooling these components, is accomplished by implementing a cooling system that is comprised of fluid filled cooling loops, radiators, fans, pumps, an air conditioning condenser and a controller. The pumps move the fluid through the cooling loops, allowing the fluid to absorb heat from the components and vent through the radiators with help from the fan's airflow. The controller monitors component temperature data by measuring actual component temperature or corresponding coolant temperature and compares the component temperature data to a calibratable threshold to determine whether the fan should operate. By controlling fan speed, the controller regulates airflow across the radiator and air condenser, to maintain coolant temperature, and subsequently component temperatures within acceptable parameters.

34 Claims, 4 Drawing Sheets

POWER ELECTRONICS COOLING FOR A HYBRID ELECTRIC VEHICLE

BACKGROUND OF THE INVENTION

FIELD OF INVENTION

The present invention relates generally to a Hybrid Electric Vehicle (HEV), and specifically to an HEV system controller to monitor component conditions such as temperature and control the cooling system fan speed.

The need to reduce fossil fuel consumption by and emissions from automobiles and other vehicles powered by an Internal Combustion Engine (ICE) is well known. Vehicles powered by electric motors attempt to address these needs. However, electric vehicles have limited range, limited power capabilities and need substantial time to recharge their batteries. An alternative solution is to combine both an ICE and electric traction motor into one vehicle. Such vehicles are typically called Hybrid Electric Vehicles (IEVs). See generally, U.S. Pat. No. 5,343,970 (Severinsky).

The HEV is described in a variety of configurations. Many HEV patents disclose systems in which an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A Parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE.

A Parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gearset transaxle. A first electric motor, the generator, is connected to a sun gear. The ICE is connected to a carrier. A second electric motor, a traction motor, is connected to a ring (output) gear via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used.

The desirability of combining an ICE with an electric motor is clear. The ICE's fuel consumption and emissions are reduced with no appreciable loss of vehicle performance or range. Nevertheless, there remains a substantial opportunity to develop ways to optimize HEV operation.

One such area of development is in the HEV's cooling system. In conventional vehicles, the cooling system has a variety of components that require cooling by a fluid cooling system, radiator and fan. Fluid cooled components typically include the engine and transmission. A fluid coolant circulates through a closed cooling loop, passes through each component to absorb heat, and then passes through the radiator. The radiator exposes the coolant to the fan's airflow and releases the heat. A controller monitors engine and transmission temperatures and adjusts fan speed to maintain acceptable coolant temperature for that cooling loop. In addition to the fluid cooled components, the air conditioning (A/C) condenser requires cooling from airflow, that comes from the fan(s) to keep the A/C compressor head pressures at acceptable levels.

HEVs contain new components not included in conventional cooling systems. Therefore, a new cooling system must be devised to maintain HEV component function, efficiency, and productivity.

SUMMARY OF THE INVENTION

Accordingly, the present invention provides a method and system to cool HEV components.

Controlling HEV component temperatures below calibratable thresholds ensures not only functionality of vehicle components but also operational efficiency. The present invention identifies components requiring cooling. These components are both related to the ICE and unique to the HEV as part of the electric drive system. The HEV electric drive system can include a DC/DC converter, transmission, inverter, generator motor, and traction motor. The present invention combines both component groups into one cooling system, thereby avoiding redundancy while maintaining efficiency.

A pump maintains system component temperature by moving coolant through the closed cooling loop. As the coolant passes through each component, it absorbs component heat. The coolant then passes through a radiator where the coolant vents heat to the outside when exposed to fan airflow.

A controller monitors component temperatures and regulates the fan speed. Component temperatures are determined by measuring actual component temperatures such as cylinder head temperature, transmission/transaxle oil temperature, inverter die temperature, and motor winding temperatures or by measuring the coolant temperature. The controller compares component temperatures with calibratable thresholds to determine whether the fan should be operating and, if so, at what speed the fan should be operating.

DETAILED DESCRIPTION OF THE PREFERRED EMBODIMENTS

Figure 1:
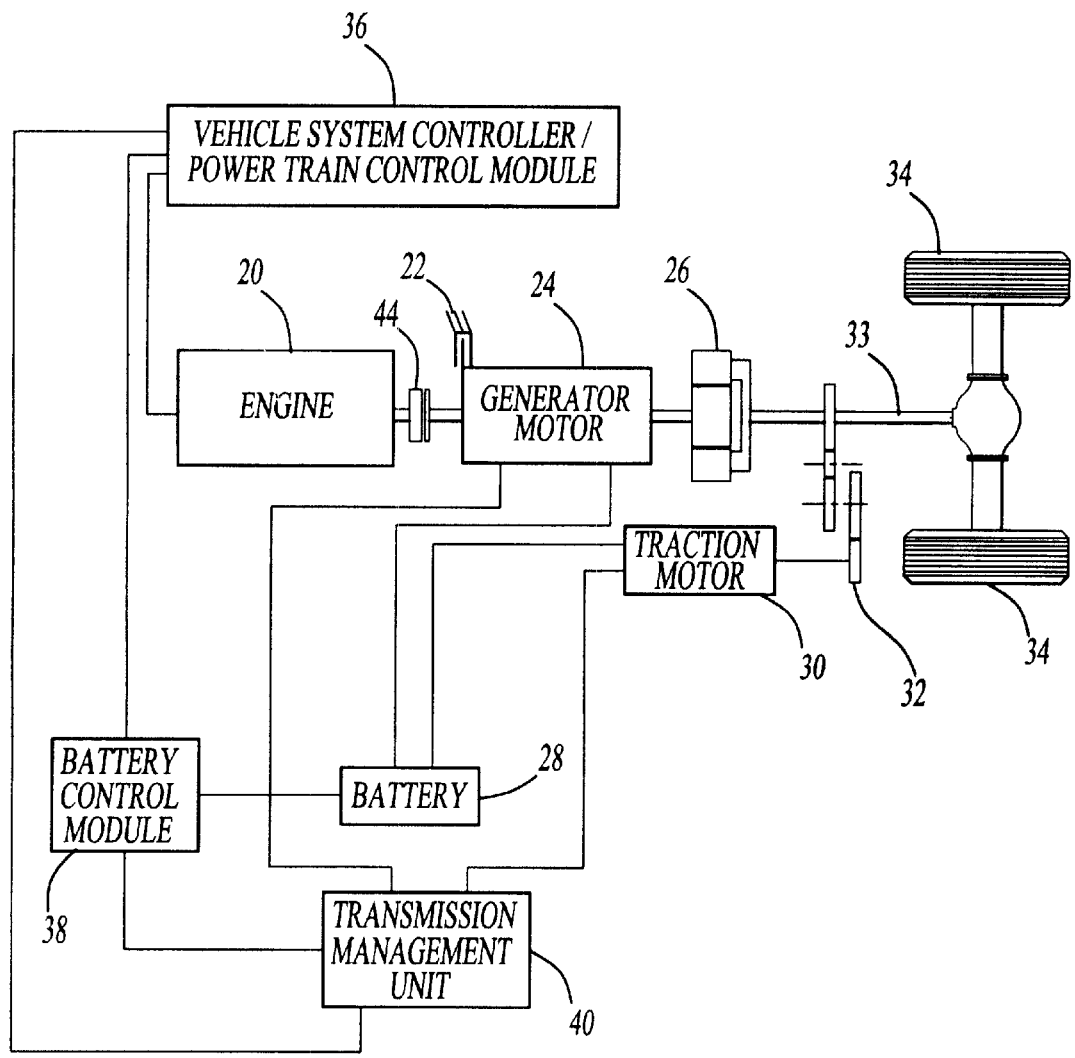
FIG. 1 illustrates the general layout of a Hybrid Electric Vehicle.

The present invention relates to Electric Vehicles and, more particularly, Hybrid Electric Vehicles (HEV). FIG. 1 demonstrates just one possible configuration, specifically a Parallel/Series Hybrid Electric Vehicle (powersplit) configuration. In a basic HEV, a Planetary Gear Set 26 mechanically couples a carrier gear to an Engine 20 via a One Way Clutch 44. The Planetary Gear Set 26 also mechanically couples a sun gear to a Generator Motor 24 and a ring (output) gear to a Traction Motor 30. The Generator Motor 24 also mechanically links to a Generator Brake 22 and is electrically linked to a Battery 28. The Traction Motor 30 is mechanically coupled to the ring gear of the Planetary Gear Set 26 via a Second Gear Set 32 and is electrically linked to the Battery 28. The ring gear of the Planetary Gear Set 26 is mechanically coupled to Drive Wheels 34 via an Output Shaft 33.

The Planetary Gear Set 26, splits the Engine 20 output energy into a series path from the Engine 20 to the Generator Motor 24 and a parallel path from the Engine 20 to the Drive Wheels 34. Engine 20 speed can be controlled by varying the split to the series path while maintaining the mechanical connection through the parallel path. The Traction Motor 30 augments the Engine 20 power to the Drive Wheels 34 on the parallel path through the Second Gear Set 32. The Traction Motor 30 also provides the opportunity to use energy directly from the series path, essentially running off power created by the Generator Motor 24, thereby reducing losses associated with converting energy into and out of chemical energy in the Battery 28.

Many components in this configuration are controlled by a Vehicle System Controller ("VSC") 36. The VSC 36, operates all main vehicle components by connecting to each component controller. The VSC 36 typically contains a Powertrain Control Module (PCM) although it can be housed in a separate unit.

The combined VSC/PCM 36 is then connected to the Engine 20 via a hardwire interface. The VSC 36 is also connected to a Battery Control Unit ("BCU") 38, and a Transmission Management Unit ("TMU") 40 through a Communication Network. The BCU 38 is then connected to the Battery 28 via hardwire interface. The TMU 40 controls the Generator Motor 24 and Traction Motor 30 via a hardwire interface.

An HEV cooling system must maintain component operation and performance. Overheated components adversely affect efficiency and may eventually cause component failure. Therefore, HEV components that need cooling to function or maintain operating goals or efficiency standards must be determined followed by development of appropriate ways to cool a them. The present invention provides such a method and system for cooling HEV components via fan control. Specifically, the present invention incorporates electric drive system components, including but not limited to, a transmission, electric motors, inverters, and DC/DC converters. Although this requires a new fan control scheme, incorporating the new components into existing fan control logic avoids redundancy; thereby, increasing efficiency and reducing build cost.

Figure 2:
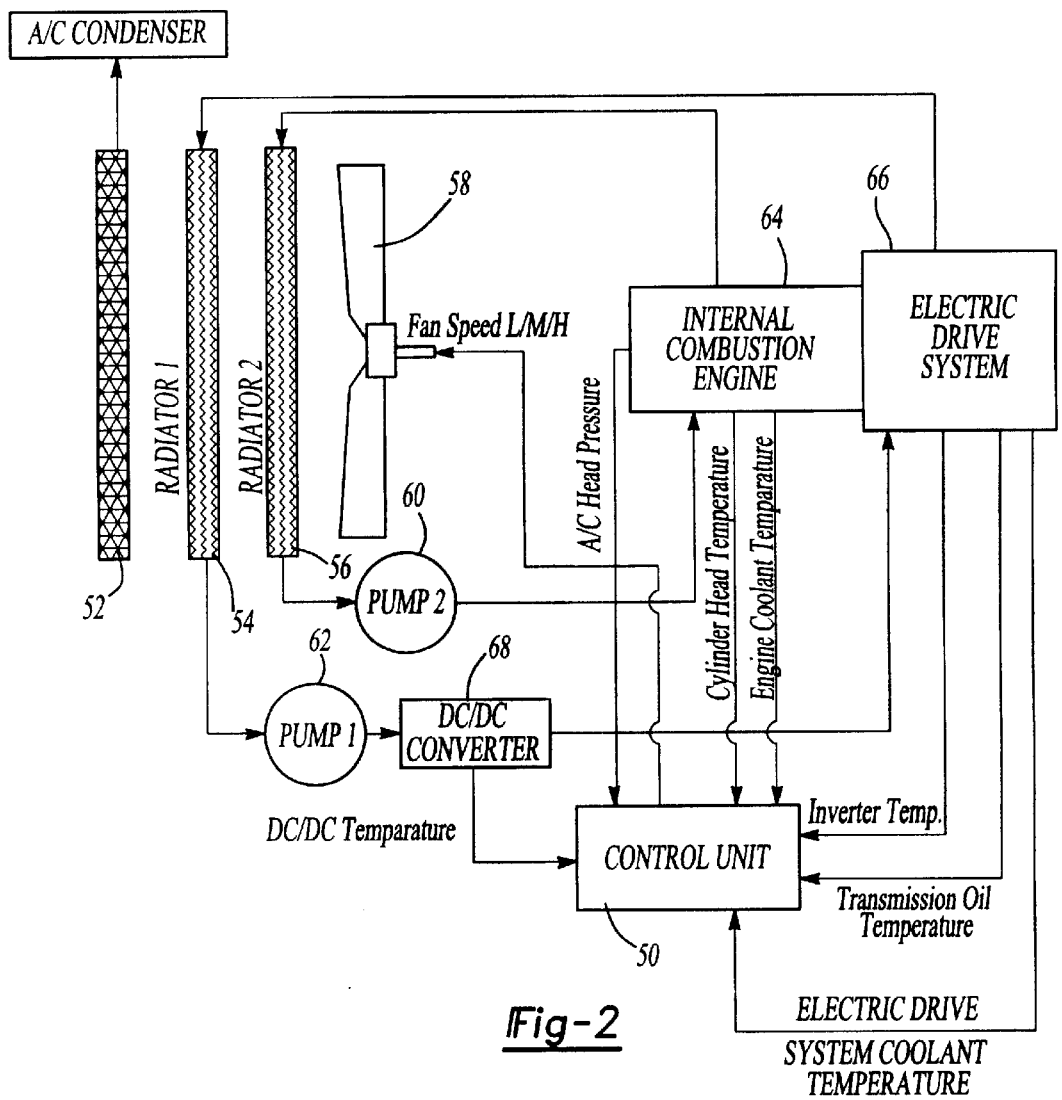
FIG. 2 illustrates the cooling system for a Hybrid Electric Vehicle.

FIG. 2 is a basic HEV cooling system. The system has two closed coolant loops. The loops travel through components absorbing heat and then venting the heat from the radiator(s) with the help of the fan.

The first closed loop system starts at a First Radiator 54, and runs through a DC/DC Converter 68 and an Electric Drive System 66. The coolant is moved through this system by a First Pump 62. A second closed loop system starts at Second Radiator 56, and runs through an Internal Combustion Engine ("ICE") 64. The coolant in this loop is moved by a Second Pump 60. It is preferable to have two separate closed loops (one for the ICE 64, and one for the Electric Drive System 66) because the ICE 64 operates more efficiently at a warmer temperature than the Electric Drive System 66. It is possible to have one closed loop that runs through all the components, but the coolant would have to be kept cooler to meet the more stringent requirements of the Electric Drive System 66. It is also possible to use one pump even though two loops exist. A single pump would simply have two impellers.

The described HEV cooling system of the present invention also contains a Control Unit 50 to control Fan 58 speed. (Note, FIG. 2 shows only one fan). Alternatively, a system of fans could be used. For example, a system could include two fans such that low speed is one fan on low, medium speed is both fans on low, and high speed has both fans on high). The Fan 58 is adjacent to an A/C Condenser 52, the First Radiator 54 and the Second Radiator 56. It is necessary for the Fan 58 to be in close proximity to the First Radiator 54 and the Second Radiator 56 such that Fan 58 speed directly impacts airflow across these components. This allows the coolant to vent the absorbed heat to the atmosphere. The Fan 58 also provides airflow across the A/C Condenser 52, which produces cool air for the vehicle cabin. Controlling the Fan 58 operation is an important part of the cooling system. It is necessary to know when the Fan 58 should be on and at what speed the Fan 58 should operate.

The present invention proposes a control system that incorporates the new HEV components (the Electric Drive System 66 and the DC/DC Converter 68) and the. Control Unit 50 that operates the, Fan 58. The Control Unit 50 sends either the coolant temperatures from the cooling loops or the actual device temperatures (including the ICE 64, Electric Drive System Components 66, DC/DC Converter 68, and A/C head pressure from the output hose of an A/C Compressor). Next, the system runs a logic routine within the Control Unit 50 to determine whether the Fan 58 should be on and at what speed.

Specifically, the Control Unit 50 receives input data from the components that need to be cooled. The Control Unit 50 receives either the coolant temperature from the Electric Drive System 66 and DC/DC Converter 68 cooling loop or the actual component temperature of the Electric Drive System 66 and DC/DC Converter 68. The Control Unit 50 receives either the cylinder head temperature or ICE 64 coolant temperature from the ICE 64. The Control Unit 50 also receives the A/C head pressure from a high-pressure line coming from the A/C Compressor. (e.g., via a pressure transducer). Once the Control Unit 50 has all of these inputs, a logic scheme determines whether the Fan 58 should be running and at what speed.

Figure 3A:
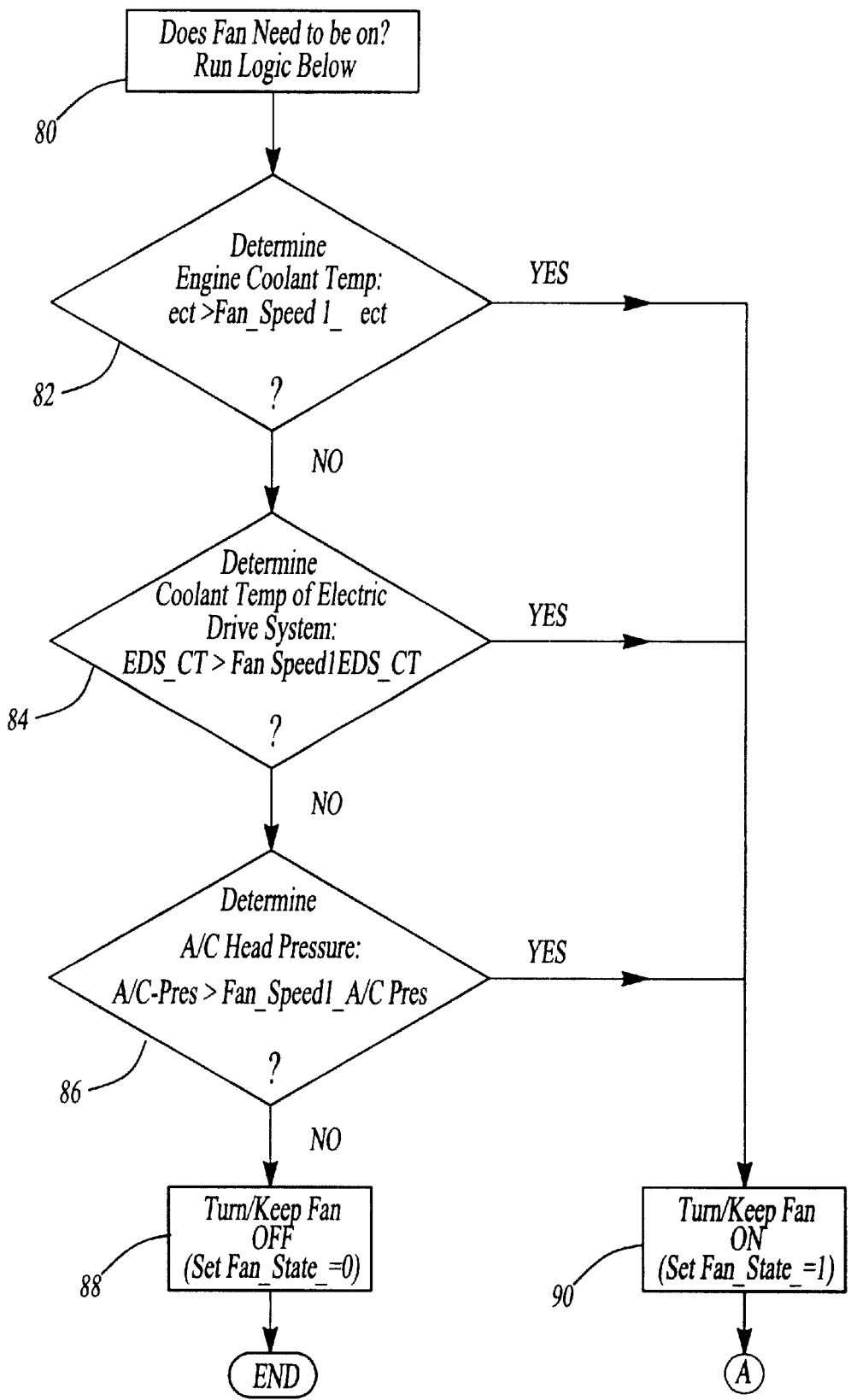
FIGS. 3a–3b illustrates by flow chart the steps to determine fan operation.
Figure 3B:
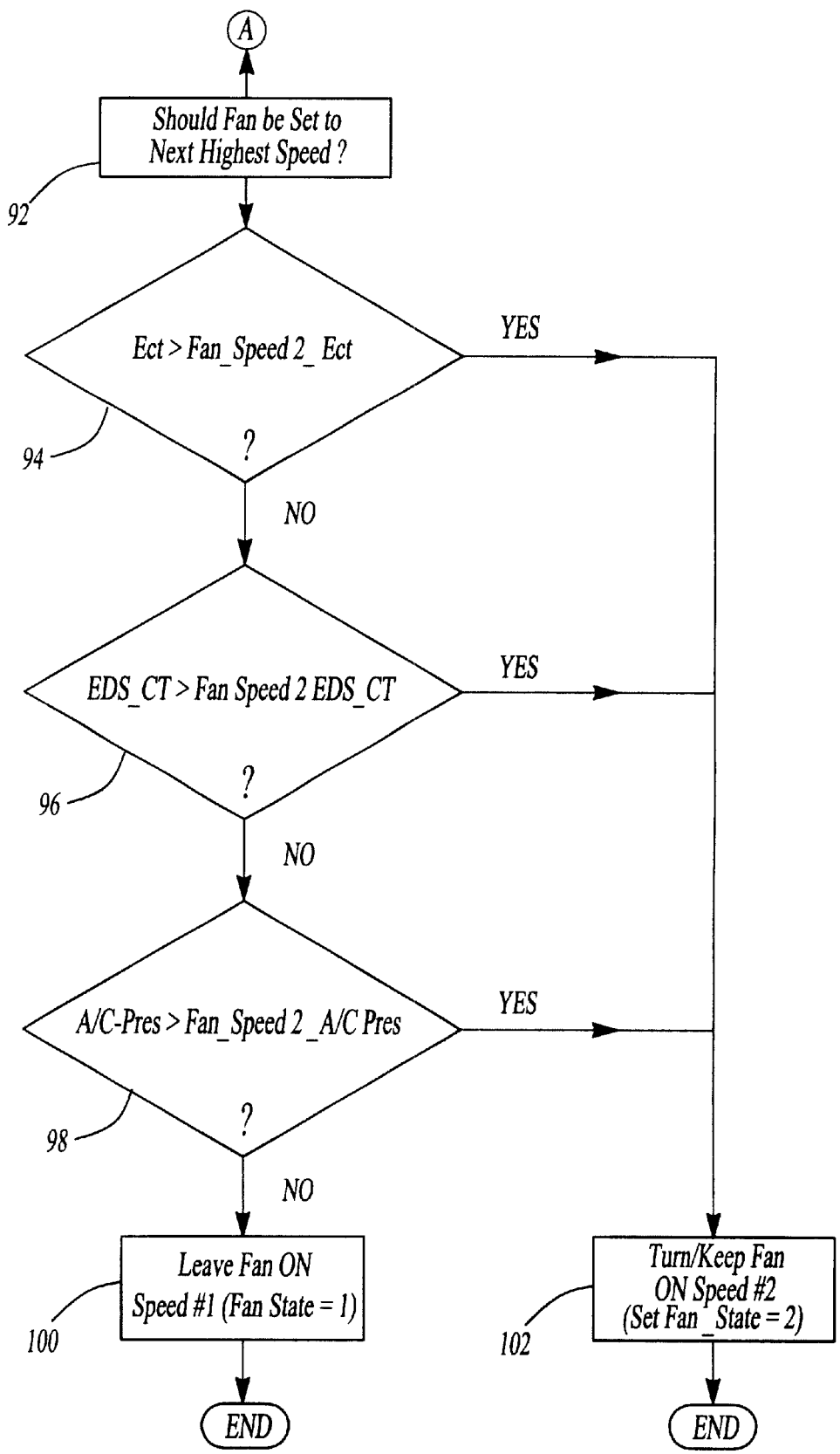

FIG. 3 demonstrates the logic that the Control Unit 50 needs to determine Fan 58 operation. At Step 80, the Control Unit 50 runs the fan logic routine. The logic routine includes a series of steps to determine whether the Fan 58 should be on and at what speed the Fan 58 should run. All these steps determine whether any measured coolant or component temperatures or A/C head pressure exceed calibratable thresholds and therefore require the Fan 58 to operate. These calibratable thresholds are determined by component performance and heat tolerance. Thresholds should be set to ensure component functionality and efficiency.

Step 82 determines whether ICE 64 coolant temperature exceeds a calibratable threshold for the lowest Fan 58 speed (ECT>FAN_SPEED1_ECT). Alternatively, Step 82 could use the ICE 64's cylinder head temperature to execute this block of the Fan 58 logic.

Step 84 determines whether the electric drive system's coolant temperature exceeds a calibratable threshold for the lowest Fan 58 speed (EDS_CT>FAN_SPEED1_EDS_CT). Alternatively, individual component temperatures of the electric drive system can be used (instead of the temperature of the coolant in the electric drive system's cooling loop) to execute this block of the Fan 58 logic. These components include, but are not limited to, inverter die temperature, DC/DC converter temperature, electric motor (generator or traction motor) winding temperature(s), and transmission/transaxle oil temperature.

Step 86 determines whether the A/C head pressure exceeds a calibratable threshold for the lowest Fan 58 speed (AC_PRES>FAN_SPEED1_AC_PRES).

If the logic routine runs through these steps and determines that none of the thresholds are exceeded, the routine proceeds to Step 88 where the Fan 58 is turned off or remains off by setting the "fan on" state flag to 0 (FAN_STATE=0, off). If any one of the measured temperatures exceeds their applicable threshold, the system immediately proceeds to Step 90 and the Fan 58 is turned on or kept on at the lowest Fan 58 speed state by setting the "fan on" state flag to 1 (FAN_STATE=1, lowest speed setting).

If the Fan 58 is on and in the lowest speed state (FAN_STATE=1), the logic routine proceeds to step 92 to determine if the next higher Fan 58 speed is required. Step 94 determines whether the ICE coolant temperature exceeds a calibratable threshold for the next highest Fan 58 speed (ECT>FAN_SPEED2_ECT). Alternatively, Step 94 could use the ICE's cylinder head temperature (instead of the temperature of the coolant in the ICE's cooling loop) to execute this block of the Fan 58 logic.

Step 96 determines whether the electric drive system's coolant temperature exceeds a calibratable threshold for the next highest Fan 58 speed (EDS_CT>FAN_SPEED2_EDS_CT). Alternatively, individual component temperatures of the electric drive system can be used to execute this block of the Fan 58 logic.

Step 98 determines whether the A/C head pressure exceeds a calibratable threshold for the next highest Fan 58 speed (AC_PRES>FAN_SPEED2_AC_PRES).

If the logic routine runs through these steps and determines that none of the thresholds are exceeded, the routine proceeds to Step 100 where the Fan 58 is kept on by keeping the "fan on" state flag at 1 (FAN_STATE=1, lowest speed setting). In the event any one of the measured temperatures exceeds their applicable threshold, the system immediately proceeds to Step 102 and the Fan 58 is turned on or kept on at the next highest Fan 58 speed state by setting the "fan on" state flag to 2 (FAN_STATE=2, next highest speed setting).

If Fan 58 hardware is capable of more than 2 fan speeds, then the logic can continue on with additional flow logic similar to steps 92 through 102 to determine if additional Fan 58 speed is required., Each coolant or component temperature check would then be compared to calibratable thresholds relating to the next highest required Fan 58 speed (e.g., FAN_SPEED3_ECT, FAN_SPEED3_EDS_CT, FAN_SPEED3_AC_PRES, . . .).

What is claimed is:

1. A method of operating a Hybrid Electric Vehicle (HEV) having an internal combustion engine and a plurality of electronic components, the engine and the electronic components each having a corresponding desired operating temperature, the method comprising the steps of:

determining a temperature of the internal combustion engine;

determining a temperature of each of the electronic components;

controlling simultaneously a plurality of separately controllable cooling loops corresponding to the internal combustion engine and the electronic components; and determining a desired speed for a cooling fan based on the temperatures of the electronic components and the internal combustion engine.

2. The method of operating an HEV according to claim 1, wherein the method further comprises the steps of:

determining air conditioning compressor head pressure; and determining a desired speed for a cooling fan based on the temperatures of the electronic components, the internal combustion engine and the air conditioning compressor head pressure.

3. The method of operating an HEV according to claim 2, wherein the step of determining a desired speed for a cooling fan comprises the steps of:

determining if internal combustion engine temperature exceeds first and second calibratable thresholds;

determining if electronic component temperature exceeds third and fourth calibratable thresholds;

determining if air conditioning compressor head pressure exceeds fifth and sixth calibratable thresholds; and setting a fan state.

4. The method of operating an HEV according to claim 1, wherein the plurality of cooling loops comprises a first cooling loop and a second cooling loop.

5. The method of operating an HEV according to claim 4, wherein the first cooling loop comprises:

a first radiator;

a first pump;

a DC/DC converter; and an electric drive system.

6. The method of operating an HEV according to claim 5, wherein the electric drive system comprises:

a traction motor;

a generator motor;

a transmission/transaxle; and an inverter.

7. The method of operating an REV according to claim 4, wherein the second cooling loop comprises:

a second radiator;

a second pump; and the internal combustion engine.

8. The method of operating an HEV according to claim 4, wherein the step of determining a temperature of each of the electronic components comprises the step of:

determining a temperature of a cooling fluid in the first cooling loop.

9. The method of operating an REV according to claim 4, wherein the step of determining a temperature of the internal combustion engine comprises the step of:

determining a temperature of a cooling fluid in the second cooling loop.

10. The method of operating an HEV according to claim 1, wherein the step of determining a temperature of each of the electronic components comprises the steps of:

determining a transmission/transaxle oil temperature;

determining an inverter die temperature;

determining a DC/DC converter temperature;

determining a traction motor winding temperature; and determining a generator motor winding temperature.

11. The method of operating an REV according to claim 1, wherein the step of determining a temperature of the internal combustion engine comprises the step of:

determining a temperature of a cylinder head of the internal combustion engine.

12. A system to operate a Hybrid Electric vehicle (HEV), comprising:

an internal combustion engine;

a plurality of electronic components;

the internal combustion engine and the electronic components each having a corresponding desired operating temperature;

means to determine a temperature of the internal combustion engine;

means to determine a temperature of each of the electronic components;

a plurality of separately controllable cooling loops corresponding to the internal combustion engine and the electronic components;

means to determine a desired speed for a cooling fan based on the temperatures of the electronic components and the internal combustion engine.

13. The system to operate an HEV according to claim 12, further comprising:

an air conditioning compressor;

means to determine air conditioning compressor head pressure; and means to determine a desired speed for a cooling fan based on the temperatures of the electronic components, the internal combustion engine and the air conditioning head pressure.

14. The system to operate an HEV according to claim 13, wherein the means to determine a desired speed for a cooling fan comprises:

means to determine if internal combustion engine temperature exceeds first and second calibratable thresholds;

means to determine if electronic component temperature exceeds third and fourth calibratable thresholds;

means to determine if air conditioning compressor head pressure exceeds fifth and sixth calibratable thresholds; and means to set a fan state.

15. The system to operate an REV according to claim 12, wherein the plurality of cooling loops comprises a first cooling loop and a second cooling loop.

16. The system to operate an HEV according to claim 15, wherein the first cooling loop comprises:

a first radiator;

a first pump;

a DC/DC converter; and an electric drive system.

17. The system to operate an HEV according to claim 16, wherein the electric drive system comprises:

a traction motor;

a generator motor;

a transmission/transaxle; and an inverter.

18. The system to operate an HRV according to claim 15, wherein the second cooling loop comprises:

a second radiator;

a second pump; and the internal combustion engine.

19. The system to operate an HEV according to claim 15, wherein the means to determine a temperature of each of the electronic components comprises:

means to determine a temperature of a cooling fluid in the first cooling loop.

20. The system to operate an HEV according to claim 15, wherein the means to determine a temperature of the internal combustion engine comprises:

means to determine a temperature of a cooling fluid in the second cooling loop.

21. The system to operate an HEV according to claim 12, wherein the means to determine a temperature of each of the electronic components comprises:

means to determine transmission/transaxle oil temperature;

means to determine an inverter die temperature;

means to determine a DC/DC converter temperature;

means to determine a traction motor winding temperature; and means to determine a generator motor winding temperature.

22. The system to operate an HEV according to claim 12, wherein the means to determine a temperature of the internal combustion engine comprises: means to determine a temperature of a cylinder head of the internal combustion engine.

23. An article of manufacture to operate a Hybrid Electric Vehicle (HEV), comprising:

a controller; and a control system embodied within the controller to determine a desired speed for a cooling fan by determining if internal combustion engine temperature exceeds first and second calibratable thresholds, determining if electronic component temperature exceeds third and fourth calibratable thresholds, determining if air conditioning compressor head pressure exceeds fifth and&:sixth calibratable thresholds, and setting a fan state.

24. An automotive vehicle, comprising:

an internal combustion engine;

a plurality of electronic components;

the internal combustion engine and the electronic components each having a corresponding desired operating temperature;

means to determine a temperature of the internal combustion engine;

means to determine a temperature of each of the electronic components;

a plurality of separately controllable cooling loops corresponding to the internal combustion engine and the electronic components;

means to determine a desired speed for a cooling fan based on the temperatures of the electronic components and the internal combustion engine.

25. The automotive vehicle according to claim 24, further comprising:

an air conditioning compressor;

means to determine air conditioning compressor head pressure; and means to determine a desired speed for a cooling fan based on the temperatures of the electronic components, the internal combustion engine and the air conditioning head pressure.

26. The automotive vehicle according to claim 25, wherein the means to determine a desired speed for a cooling fan comprises:

means to determine if internal combustion engine temperature exceeds first and second calibratable thresholds;

means to determine if electronic component temperature exceeds third and fourth calibratable thresholds;

means to determine if air conditioning compressor head pressure exceeds fifth and sixth calibratable thresholds; and means to set a fan state.

27. The automotive vehicle according to claim 24, wherein the plurality of cooling loops comprises a first cooling loop and a second cooling loop.

28. The automotive vehicle according to claim 27, wherein the first cooling loop comprises:

a first radiator;

a first pump;

a DC/DC converter; and an electric drive system.

29. The automotive vehicle according to claim 28, wherein the electric drive system comprises:

a traction motor;

a generator motor;

a transmission/transaxle; and an inverter.

30. The automotive vehicle according to claim 27, wherein the second cooling loop comprises:

a second radiator;

a second pump; and the internal combustion engine.

31. The automotive vehicle according to claim 27, wherein the means to determine a temperature of each of the electronic components comprises:

means to determine a temperature of a cooling fluid in the first cooling loop.

32. The automotive vehicle according to claim 27, wherein the means to determine a temperature of the internal combustion engine comprises:

means to determine a temperature of a cooling fluid in the second cooling loop.

33. The automotive vehicle according to claim 24, wherein the means to determine a temperature of each of the electronic components comprises:

means to determine transmission/transaxle oil temperature;

means to determine an inverter die temperature;

means to determine a DC/DC converter temperature;

means to determine a traction motor winding temperature; and means to determine a generator motor winding temperature.

34. The automotive vehicle according to claim 24, wherein the means to determine a temperature of the internal combustion engine comprises:

means to determine a temperature of a cylinder head of the internal combustion engine.

* * * * *